Dec. 18, 1923.
N. J. WEIR
1,478,154
SPOTLIGHT BRACKET
Filed Sept. 29, 1921
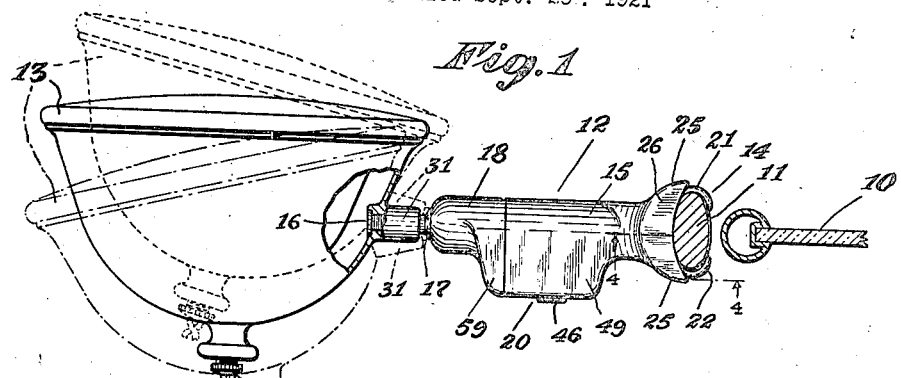
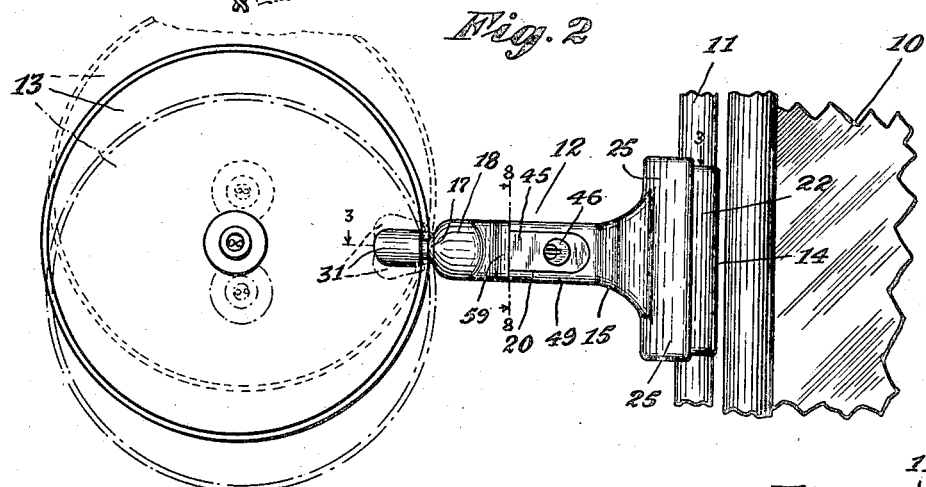
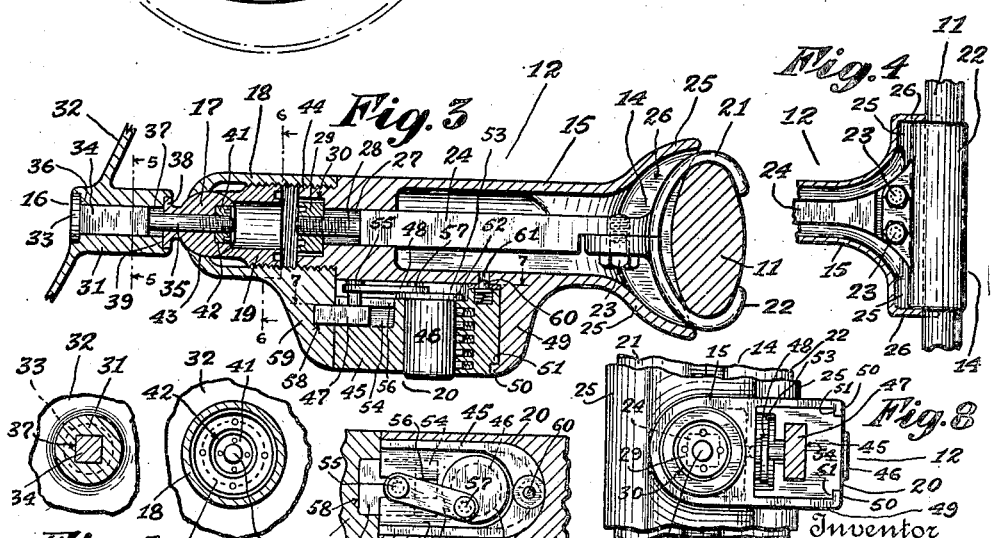
Inventor
Nelson J. Weir.
Attorney
Frank Warren Patented Dec. 18, 1923.

1,478,154

UNITED STATES PATENT OFFICE.

NELSON J. WEIR, OF SEATTLE, WASHINGTON.

SPOTLIGHT BRACKET.

Application filed September 29, 1921. Serial No. 504,090.

*To all whom it may concern:*

Be it known that I, NELSON J. WEIR, a citizen of the Dominion of Canada, residing at Seattle, in the county of King and State of Washington, have invented a certain new and useful Improvement in Spotlight Brackets, of which the following is a specification.

My invention relates to improvements in spotlight brackets and aims primarily to provide a hollow sectional spotlight bracket designed when the sections thereof are in juxtaposed and locked relation to enclose and render inaccessible the windshield frame clamp and the means for securing the spotlight to the bracket, to thus prevent the removal of the spotlight from the bracket and the bracket from the windshield frame except by the person provided with the proper key for the lock.

With these ends in view the invention resides in the provision of a spotlight bracket that is simple, durable, efficient and reliable in use and capable of being manufactured at a comparatively low cost.

With the above and other objects in view which will appear as the description proceeds, my invention resides in the novel construction, combination, adaptation and arrangement of parts hereinafter described and claimed.

I accomplish these objects by devices illustrated in the accompanying drawings, wherein:—

Figure 1 is a view in top plan of a spotlight bracket embodying the features and principles of my invention, as it would appear when operatively disposed upon the windshield frame of an automotive vehicle, parts of said view being in section and broken away to better illustrate the features of my invention.

Fig. 2 is a view in rear side elevation of my spotlight bracket, as it would appear when operatively upon the windshield frame of its associated automotive vehicle.

Fig. 3 is a view in horizontal section of the same taken substantially on a broken line 3—3 of Fig. 2, parts being in elevation.

Fig. 4 is a fragmentary view in vertical longitudinal section taken substantially on a broken line 4—4 of Fig. 1, parts being in elevation.

Fig. 5 is a fragmentary view in transverse section taken substantially on a broken line 5—5 of Fig. 3.

Fig. 6 is a similar view and section taken substantially on a broken line 6—6 of Fig. 3, parts being in elevation.

Fig. 7 is a fragmentary view in horizontal section taken substantially on a broken line 7—7 of Fig. 3 and illustrating the several elements of my locking mechanism in elevation, and Fig. 8 is a fragmentary view in transverse section taken substantially on a broken line 8—8 of Fig. 2, and illustrating the several elements comprising my locking mechanism in end elevation.

Referring to the drawings throughout which like reference numerals designate like parts, the numeral 10 designates the windshield of an automotive vehicle, not shown, 11 designates the left hand portion of the windshield frame, 12 designates my improved bracket adapted to be fixedly secured to the frame 11 and 13 designates a spotlight of any well known or desired form adapted to be operatively secured in locked relation to the said frame 11 through the medium of the said bracket 12.

The bracket 12 comprises a windshield frame clamp 14, a guard member or hollow section or casing 15, a securing bolt 16, a ball member 17, a socket member or hollow section 18, a tubular retaining member 19 and a locking mechanism 20.

The clamp member 14 comprises oppositely disposed jaws 21 and 22, which jaws are formed substantially in the shape shown and are adapted to be fixedly secured or clamped together upon the windshield frame 11, as by cap screws 23.

Extending outwardly from the jaw 21 in perpendicular and medial relation thereto is an integral square shank portion 24, which shank portion is adapted to receive or engage the guard member 15 substantially as shown in Fig. 3.

The guard member 15 is formed substantially in the shape and manner shown and is provided upon its inner end with outwardly flaring side walls 25, which walls are adapted to normally surround or enclose the securing means of the jaws 21 and 22, as shown in Fig. 3, to thereby prevent the unauthorized detachment of the said jaws from their associated frame 11.

The flaring side walls 25 are integrally connected at their upper and lower ends by end walls 26, the outer edges of which end walls are formed arcuate, as shown, to fit the curvature of the frame 11 and to normally abut the outer face or side thereof.

To positively prevent turning movement of the guard member 15 when positioned upon the clamp 14, I have provided the member 15 adjacent its outer end with an axially disposed square bore 27, which bore is adapted to normally receive the outer end of the square shank 24, as shown in Fig. 3.

To positively maintain and retain the guard member 15 upon its associated clamp 14, I provide the outer end of the shank portion 24 of said clamp 14 with a threaded stem 28, which stem is adapted to extend outwardly in prolongation to the said shank portion 24 and to be threadably engaged at its outer end by a nut 29, which nut is adapted to normally seat in a recess 30 formed in the outer end of the guard member 15.

The securing bolt 16 is adapted to be normally and axially disposed within a boss 31 formed upon the side of the casing 32 of the spotlight 13, substantially as shown in Fig. 3. The said bolt comprising a disc-like head 33, a square shank portion 34 and a threaded stem portion 35.

The disc-like head 33 of the bolt 16 is adapted to seat in a recess 36 formed in the inner end of the boss 31, while the square shank portion 34 of said bolt is adapted to be normally disposed within an axially disposed square bore 37 formed in said boss to thus positively prevent turning movement of said bolt within said boss 31.

The threaded stem portion 35 of the bolt 16 is adapted to extend outwardly in prolongation to the square shank portion 34 of said bolt and is adapted to receive upon its outer end in axial relation thereon the ball member 17.

The ball member 17 is provided on one side thereof with a flanged extension 38, which extension is adapted to normally seat in a recess 39 formed in the outer end of the boss 31, substantially as shown in Fig. 3.

To positively maintain and retain the ball member 17 in fixed relation upon the bolt 16 as well as to prevent axial movement of said bolt within its associated boss 31, I have provided a nut 41, which nut is adapted to be threadably engaged upon the outer end of the stem portion 35 and to seat in a suitable recess or counterbore 42 formed within the ball member 17.

The socket member 18 is formed substantially in the shape and manner shown in Fig. 3 and is provided upon its outer end with an axially disposed annular seat 43 within which the ball member 17 is adapted to seat, the said annular seat being of such size as to readily permit of the flanged extension 38 of the ball member 17 passing therethrough during the assembling of the several elements comprising my bracket, as is obviously and apparently necessary and essential during such assemblage.

The ball member 17 is positively maintained and retained within and upon its associated annular seat 43 of the socket member 18 by the exteriorly threaded tubular retaining member 19, which tubular member is adapted to be threadably and axially disposed for longitudinal adjustment within the internally threaded walls of the said socket member 18, as shown in Fig. 3.

It will be obvious and readily apparent by referring to Fig. 3 that the desired or selected amount of friction may be brought to bear upon the ball member 17 by adjusting the tubular retaining member 19, to thus frictionally retain the spotlight in any desired angular direction or position while still permitting of the ready and rapid adjustment of said spotlight to some other position.

The bore of the tubular retaining member 19 is formed of a sufficiently large size to permit of the ready and rapid adjustment or removal and replacement of the nut 41 of the bolt 16, to thus permit of the rapid detachment of the ball member 17 from the spotlight 13 with the minimum amount of dismantling of parts.

To fixedly secure the socket member 18 upon the guard member 15, I have provided the said guard member 15 upon its outer end with an exteriorly threaded axially disposed extension 44, which extension 44 is adapted to be normally and threadably engaged with the interiorly threaded inner end of the said socket member 18, substantially as shown in Fig. 3.

The locking mechanism 20 comprises a casing 45, a barrel or pin lock 46, a locking bar or element 47 and a connecting link 48.

The casing 45 is formed substantially in the shape and manner shown and is adapted to be mounted within a recessed boss or extension 49 formed upon the rear side of the guard member 15 adjacent the outer end thereof.

To prevent dislodgment of the casing 45 from its associated recessed boss 49 in an outward direction and to normally maintain and retain the said casing within the said recessed boss, I have provided the outer edges of said recessed boss with inwardly directed flanged portions 50, which flanged portions are adapted to normally abut and engage shoulder portions 51 formed upon the outer edges of the casing 45, as more clearly shown in Figs. 3 and 8.

The barrel or pin lock 46 may be of any well known or desired form and is adapted to be disposed for rotary movement within the casing 45 when the proper key is inserted within the said lock 46.

The barrel 46 while it is in an unlocked position may be retained within the casing 45 against axial movement in any well known or desired manner and is provided upon its inner end with a flange 52, which flange is adapted to be disposed in a recess 53 formed within the said casing 45 upon the inner side thereof, the said flange 52 being adapted to normally abut the rear wall of the said recess, substantially as shown in Figs. 3 and 8.

The locking bar or element 47 is adapted to be normally and slidably disposed within a recess or guideways 54 formed within the casing 45 adjacent the outer end thereof.

The locking bar 47 is provided upon its inner face with an inwardly directed pin 55, which pin is adapted to extend through a slot 56 formed in the casing 45 into the recess 53.

The connecting link 48 is adapted to be disposed within the recess 53 and to be pivotally connected at its outer end to the pin 55 of the locking bar 47 and at its inner end is adapted to be similarly connected to a pin 57 fixedly secured to the flange 52 of the barrel 46, to thus convert and transmit the rotary motion of the barrel 46 into reciprocative or sliding motion for the locking bar 47 during the locking and unlocking operation of the said barrel lock 46, as will be readily understood by referring to Figs. 3 and 7.

When in a normally locked position the outer end of the locking bar 47 is adapted to seat in a recess 58 formed within an extension 59, which extension may be integrally formed upon the rear side of the socket member 18 adjacent the inner end thereof, to thus positively lock the said socket member 18 to its associated guard member 15 to thereby insure and assure against the unscrewing of the said socket member from the said guard member by unauthorized persons.

To maintain and retain the casing 45 against sliding within its associated recessed boss 49, I have provided the inner face of said casing adjacent its inner end with a spring pressed pin 60 of well known form, which pin is adapted to normally seat within an opening or aperture 61 formed in the inner wall of said recessed boss 49, and as shown more clearly in Fig. 3.

In practice and after exhaustive tests I have found that a spotlight bracket fabricated in accordance with my invention is productive of the desired and maximum results as well as being neat and ornamental in appearance. I have also found in practice that a spotlight bracket fabricated as shown may be assembled, dismantled or adjusted in the minimum time, as for example, should it be necessary to adjust the position of the guard member 15, or to increase the friction upon the ball member 17 or to adjust the said ball member upon its associated bolt 16, the locking mechanism 20 is unlocked and the socket member 18 unscrewed thereby rendering the same immediately accessible in one operation.

It will therefore be apparent from the foregoing and by referring to the accompanying drawings that my improved spotlight bracket embodies the maximum theft proof qualities and that it is impossible for any person not provided with the proper key to remove the spotlight 13 from the windshield frame 11.

From the foregoing description taken in connection with the accompanying drawings, the advantages of the construction and the method of operation of my spotlight bracket will be readily apparent to those skilled in the art to which my invention pertains, to thus enable those so skilled to construct and operate the same, but, while I have shown and described the construction and operation of a spotlight bracket embodying the features and principles of my invention, which I now consider to be best embodiment thereof, I desire to have it understood that the spotlight bracket shown is merely illustrative and that such changes may be made when desired as are within the scope of my invention and embodied in the accompanying claims.

What I claim is:—

1. A spotlight bracket comprising a casing, bracket securing means enclosed by said casing, spotlight securing means disposed within said casing, and locking means to render inaccessible said bracket and spotlight securing means.

2. A spotlight bracket comprising a casing, a clamp enclosed by said casing, spotlight securing means disposed within said casing, and locking means to render inaccessible said clamp and spotlight securing means.

3. A spotlight bracket comprising a clamp, a guard member enclosing said clamp, a socket member, spotlight securing means disposed within said socket member, and means to lock said socket member and said guard member to render inaccessible said clamp and said securing means.

4. A spotlight bracket comprising a windshield frame clamp, a guard member enclosing said clamp and secured thereto, a socket member disposed upon said guard member, spotlight securing means disposed within said socket member and means to lock said socket member to said guard member whereby said clamp and said securing means are rendered inaccessible when said members are locked together to thereby prevent removal of the spotlight from the bracket and the bracket from the windshield frame.

5. A spotlight bracket comprising a windshield frame clamp, a guard member enclosing said clamp and removably secured thereon, a socket member mounted upon said guard member in prolongation thereto, adapted to enclose the securing means thereof, spotlight securing means enclosed by and disposed for universal movement within said socket member, and means to lock said socket member to said guard member whereby said clamp and said securing means are rendered inaccessible when said members are locked together to thereby prevent removal of the spotlight from the bracket and the bracket from the windshield frame.

6. A spotlight bracket comprising a windshield frame clamp, a guard member mounted upon and enclosing said clamp, means to removably secure said member upon said clamp, a socket member threadably mounted upon said guard member adapted to enclose the securing means thereof, a ball member carried by the spotlight disposed for universal movement within said socket member, means disposed within said last named member adapted to frictionally engage said ball member to retain the spotlight in the selected position, and means to lock said socket member to said guard member whereby the said clamp and the aforementioned means are rendered inaccessible when said members are locked together to thereby prevent removal of the spotlight from the bracket and the bracket from the windshield frame.

7. A spotlight bracket comprising a windshield frame clamp, having an integral shank extending outwardly therefrom, a hollow guard member open at one end thereof adapted to receive and enclose said clamp and having an aperture at the opposite end thereof adapted to receive the outer end of said shank, means carried by the outer end of said shank adapted to removably secure said guard member upon said clamp, a socket member threadably mounted upon said guard member in prolongation thereto adapted to enclose the securing means thereof, a bolt fixedly secured at one end thereof within the spotlight casing, a ball member fixedly secured to the opposite end of said bolt adapted to be disposed for universal movement within said socket member, means disposed within said socket member adapted to frictionally engage said ball to retain the spotlight in the selected position, and means carried by said guard member adapted to lock said socket member thereto whereby said clamp and aforesaid means are rendered inaccessible when said members are locked together to thereby prevent the removal of the spotlight from the bracket and the bracket from the windshield frame.

8. A spotlight bracket comprising a casing, spotlight bracket securing means enclosed by said casing, and locking means to render inaccessible said spotlight bracket securing means.

In witness whereof, I hereunto subscribe my name this 24th day of September A. D. 1921.

NELSON J. WEIR.